United States Patent [19]

Hamasaki

[11] Patent Number: 5,404,179
[45] Date of Patent: Apr. 4, 1995

[54] NOISE REDUCTION APPARATUS FOR VIDEO IMAGE

[75] Inventor: Takeshi Hamasaki, Yao, Japan

[73] Assignee: Matsushita Electric Industrial Co. Ltd., Kadoma, Japan

[21] Appl. No.: 943,308

[22] Filed: Sep. 11, 1992

[30] Foreign Application Priority Data

Sep. 13, 1991 [JP] Japan ................. 3-234498

[51] Int. Cl.$^6$ .................................. H04N 5/21
[52] U.S. Cl. .......................... 348/620; 348/624
[58] Field of Search .............. 358/167, 166, 36, 37, 358/105; H04N 9/64, 5/208, 5/213, 5/21; 348/607, 624, 618, 620, 619, 621

[56] References Cited

U.S. PATENT DOCUMENTS 4,242,705 12/1980 Ebihara ................. 358/167
4,553,165 11/1985 Bayer ..................... 358/167

FOREIGN PATENT DOCUMENTS 62-1378  1/1987  Japan .
62-14583 1/1987  Japan .
0291783 12/1990 Japan ................. H04N 208
3258170 11/1991 Japan .

OTHER PUBLICATIONS

Norio Ebihara et al; "Noise Reducer for Television Signals using Hadamard Transform"; The Journal of the Institute of Television Engineers of Japan, vol. 37, No. 12 (Dec. 1983) pp. 1030(56)–1036(62).

Primary Examiner—Victor R. Kostak
Assistant Examiner—Nathan J. Flynn
Attorney, Agent, or Firm—Cushman, Darby & Cushman

[57] ABSTRACT

A field difference signal of a luminance signal is transformed to a plurality of frequency components by the Hadamard transformation, subsequently, nonlinear operation and inverse-transformation are applied to the frequency components and the inverse-transformed field difference signal is subtracted from the luminance signal, and thereby noise in the luminance signal is reduced, on the other hand in respect to a color difference signal, motion of a video image is detected on the basis of the level of at least one of the frequency components; and when the motion of the video image is large and the level of the frequency component is larger than a predetermined value, the level of the field difference signal to be subtracted from the color difference signal is decreased; on the contrary, when the level of the frequency component is the predetermined value and below, the level of the field difference signal to be subtracted from the color difference signal is increased.

8 Claims, 10 Drawing Sheets

Motion detection circuit 9

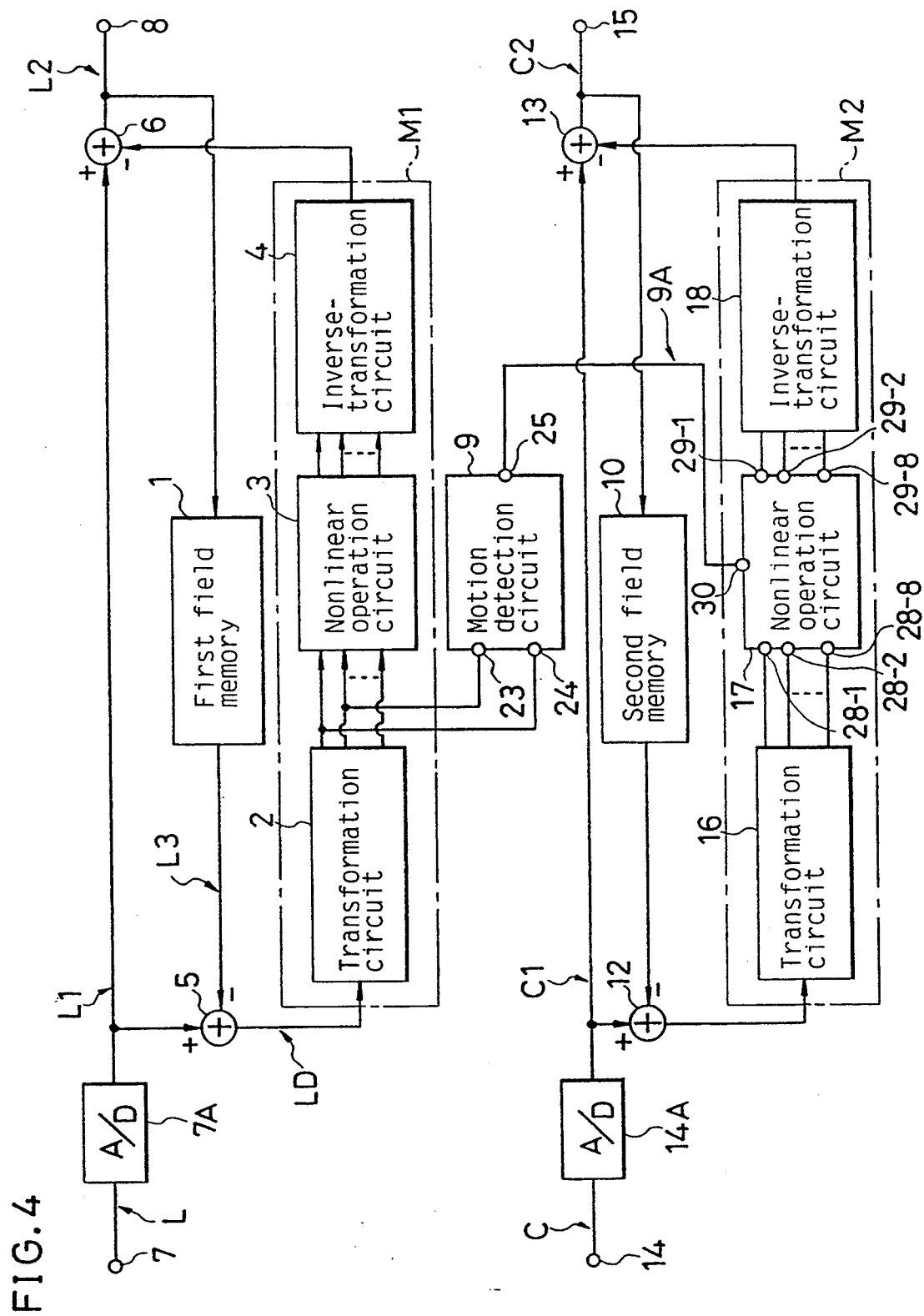

NOISE REDUCTION APPARATUS FOR VIDEO IMAGE

FIELD OF THE INVENTION AND RELATED ART STATEMENT

1. Field of the Invention

The present invention relates to a noise reduction apparatus which is to be used in a video apparatus such as a television receiver, a video camera or a video tape recorder.

2. Description of the Related Art

Recently, a noise reduction apparatus has been incorporated into a television receiver and a household video tape recorder in order to reduce a noise component in a video signal. There are several types of noise reduction apparatus. One of the noise reduction apparatus utilizes a principal that a video signal has a high correlation between two fields or two frames, but noise has no correlation between them. In actual operation of the above-mentioned type of the noise reduction apparatus, a weighted average of a signal of a previous line, field or frame and a signal of a present line, field or frame is derived. Resultant signals are output for a video signal. Concerning the weighted average of the video signal, which has correlation between its previous one and the present one, its output level is not reduced. However, concerning the component of noise, which has no correlation between the previous one and the present one, the output level is reduced. By utilizing such characteristics, the noise is selectively reduced. However, in a video image having motion, when a signal based on the weighted average of the signals between different fields or different frames is used for the video signal, an afterimage is generated on a displayed video image.

The prior arts for alleviating the afterimage are disclosed in the Japanese published unexamined patent applications Sho 62-1378 and Sho 62-14583. According to these prior arts, variation of a video signal which indicates motion of the video image is detected by using a frame difference signal which is a difference between neighboring two frames. The above-mentioned operation of deriving the weighted average is not carried out for a moving part of the video image, and an input video signal is directly output. Thereby production of the afterimage is avoided. The noise reduction apparatus of this type is directed to a composite video signal, and a part having motion is detected by the frame difference of a luminance signal. Accordingly noise reduction of only the luminance signal is carried out. It is not disclosed that the noise reduction in a chrominance signal is carried out.

The other noise reduction apparatus in the prior art operating the composite video signal is elucidated hereafter. In this prior art, the Hadamard transformation, which is an orthogonal transformation, is applied to a field difference signal of the composite video signal (which is a difference between the present field and the previous field), or to a frame difference signal of the composite video signal (which is a difference between the present frame) and the previous frame. The field difference signal or the frame difference signal is divided into a plurality of transformation components including frequency characteristic of the video image. Then, the noise transformation components are separated from the video signal transformation components. Thereby the noise is reduced and the afterimage is also alleviated. The above-mentioned prior art is disclosed in Journal of the Institute of Television Engineers of Japan (Vol. 37, No. 12, 1983), for example.

A noise reduction apparatus wherein the above-mentioned method is individually applied to the luminance signal and the color difference signal is disclosed in the Japanese published unexamined patent application Hei 3-258170. According to this prior art, a video signal is separated to a luminance signal and two color difference signals, and these signals are sampled with sampling frequencies which are different from each other in respective A/D converters. Each sampling frequency is selected so that high frequency components which are included in the Hadamard-transformed signals are included within a frequency band width of the signal. Namely, each input signal having a different frequency band width from another, such as a luminance signal (frequency band width is about 4 MHz) or a color difference signal (frequency band width is about 1 MHz) is sampled with the optimum frequency. The sampled signal is converted to a digital signal by an A/D converter, and then a frame difference signal between the previous frame and the present frame is derived. Subsequently, the frame difference signal is divided into a plurality of transformation components by the Hadamard transformation. In the Hadamard transformation, the spectrum of the video signal in the frame difference signal is concentrated in a part of the transformation components. On the contrary, the spectrum of the randomly generated noise is scattered uniformly over the entire transformation components. Consequently, the level of the video signal is larger than that of the noise in the transformation components to which the video signal concentrates, and the video signal is hardly included in other transformation components. Consequently, the video signal is easily distinguished from the noise.

In the noise reduction apparatus in accordance with such prior art, the noise is reduced in the status of occurrence of slight afterimage with respect to the luminance signal, but the noise reduction in the status of occurrence of slight afterimage is not realizable with respect to the color difference signal.

The reason is elucidated hereafter. In extracting the noise component by the Hadamard transformation, a nonlinear calculation is applied to the transformation components by a nonlinear operation circuit. The output level is limited to a predetermined constant value with respect to an input signal which is higher than a predetermined level. Since the level of noise is generally much lower than the level of the video signal, major parts of the output of the nonlinear operation circuit correspond to the noise. In the above-mentioned operation, with respect to spectra of the predetermined number of the Hadamard transformation components, when the spectra are included as many as possible within a frequency band width of the signal, the noise component is effectively reduced, and occurrence of the afterimage is also suppressed.

A relation between the Hadamard transformation components and a frequency band of the signal is elucidated hereafter. FIG. 8 is a diagram of a signal block X which is applied to the Hadamard transformation. Referring to FIG. 8, the field difference signals on a scanning line (n) are designated by $x_{00}$, $x_{01}$, $x_{02}$, $x_{03}$ and field difference signals on a scanning line (n+1) are designated by $x_{10}$, $x_{11}$, $x_{12}$, $x_{13}$. The time length of one area of the signal block X is equal to a period of a sampling frequency $f_s$ ($1/f_s$, $f_s$: sampling frequency). In FIG. 9, spectra of a transformation component $F_{00}$ (low frequency component) and transformation components $F_{01}$, $F_{02}$, $F_{03}$ (horizontal high frequency components) are shown on the abscissa graduated by frequency, and the ordinate is graduated by level.

First, with respect to a luminance signal, when the sampling frequency $f_s$ is $2\cdot f_{sc}$, for example ($f_{sc}$: color subcarrier frequency, 3.58 MHz), the spectrum of the transformation component $F_{01}$ having the highest frequency is $f_{sc}$. Since the frequency band width of the luminance signal is about 4.2 MHz in the case of the NTSC signal, the spectra of the entire transformation components are included in the frequency band width of the luminance signal. In this case, the length of the signal block X in the horizontal direction is represented by about 0.4 $\mu$ sec of the scanning time.

With respect to the color difference signal, since the frequency band width of the color difference signal is 0.5–0.8 MHz, the sampling frequency must be 0.5–1 $f_{sc}$ in order that the spectrum of the component $F_{01}$ is included in the frequency band width of the color difference signal in FIG. 9. In this case, the length of the signal block X in the horizontal direction is about 0.8–1.6 $\mu$ sec of the scanning line, and is longer than the length of the signal block X in the horizontal direction of the luminance signal.

In order that the field difference signal is clearly separated to the low frequency component and the high frequency component by the Hadamard transformation, the scanning time T2 of the signal block must be sufficiently shorter than the time length T1 of the field difference signal as shown in FIG. 10. Namely, with respect to a field difference signal generated by a video image moving on a display with a time length which is longer than twice of the scanning time T2 of the signal block during the time of one field, each signal in the Hadamard transformation is shown in FIG. 10. Referring to FIG. 10, a waveform "a" represents variation of the signal level of a scanning line of a previous field, a waveform "b" represents variation of the signal level on a scanning line of the present field, and a waveform "c" represents variation of a field difference signal level. A box "d" represents a signal block having a time length T2. Waveforms "e", "f", "g" and "h" represent the Hadamard transformation components $F_{00}$, $F_{01}$, $F_{02}$, $F_{03}$, respectively. A time T1 of the waveform "c" has a length as twice long as that of the time length T2 of the signal block. In this case, a signal representing a low frequency component is derived as the component $F_{00}$, and a signal representing a high frequency component is derived as the components $F_{00}$, $F_{02}$, $F_{03}$.

Referring to FIG. 10, the low frequency component $F_{00}$ is mainly video signal component and has a high level. When the nonlinear operation having the input-output characteristic shown in FIG. 6($a$) is applied to the low frequency component $F_{00}$, a predetermined level "a" is set to a sufficiently lower level than the level of the maximum amplitude of the low frequency component $F_{00}$, and the output level "b" is made to a sufficiently lower level than the input level of the low frequency component $F_{00}$. The high frequency components $F_{01}$, $F_{02}$, $F_{03}$ have relatively low levels. Therefore, in the nonlinear operation of these high frequency components $F_{01}$, $F_{02}$, $F_{03}$, a predetermined level "a" is set to a level which is nearly equal to the level of the maximum amplitude of the high frequency components $F_{01}$, $F_{02}$, $F_{03}$, and the respective output levels are made substantially equal to the respective input levels.

The outputs of the nonlinear operation circuits are mixed by a Hadamard inverse-transformation, and are fed back to the video signal in an adder. Consequently, a feedback ratio of the low frequency component $F_{00}$ having mainly the video signal component is decreased, and a feedback ratio of the high frequency components $F_{01}$, $F_{02}$, $F_{03}$ have mainly the noise component is increased, and thereby the noise in the video signal is reduced and occurrence of the afterimage is suppressed. Though a slight afterimage is generated by a video signal component in the high frequency components $F_{01}$, $F_{02}$, $F_{03}$, the afterimage due to the high frequency components of the video signal is not conspicuous because human eyes are insensitive to the afterimage in such high frequency.

On the contrary, in case that the time length T1 is a half of the time length T2 of the signal block as shown in FIG. 11, the level of the low frequency component $F_{00}$ is relatively lower and is not different from the levels of the high frequency components $F_{01}$, $F_{02}$, $F_{03}$. Therefore, the feedback ratio of the low frequency component $F_{00}$ is increased, and thus the afterimage is increased.

In the color difference signal, in order that the spectrum of the transformation components are present in the frequency band width of the color difference signal, a relatively low clock frequency must be used. Therefore, the time length T2 of the signal block is longer than the time length T1 of the field difference signal as shown by FIG. 11. Consequently, the level of the low frequency component $F_{00}$ is lowered as mentioned in the previous paragraph, and the feedback ratio of the low frequency component is increased. Thus the noise is effectively reduced and the afterimage is increased.

The above-mentioned consideration is applied to an actual value hereafter.

When the time length T2 of the signal block X is about 0.4 $\mu$ sec such as a case of luminance signal, occurrence of the afterimage is effectively suppressed for a video image which is moving by a distance on the video display corresponding to the scanning time of 0.8 $\mu$ sec in the period of one field (a distance on the video display corresponding to the scanning time of 48 $\mu$ sec within one second). The above-mentioned distance corresponds to a moving speed of a video image which moves from the right end to the left end of the video display during one second. In general, the afterimage is conspicuous in case of the above-mentioned moving speed. Thus, occurrence of the afterimage is effectively suppressed in the luminance signal. However, in the color difference signal, since the time length T2 of the signal block is 0.8–1.6 $\mu$ sec, the afterimage is effectively suppressed in the video image which is moving by a distance on the video display corresponding to the scanning time of 1.6–3.2 $\mu$ sec during one field (a distance on the video display corresponding to the scanning time of 96–192 $\mu$ sec during one second). Such moving speed of the video image in case of the color difference signal corresponds to a moving speed of the video image which moves by as long as 2–3 times of a horizontal direction of the video display during one second. The video image moving at such a high speed can not be detected in detail by human eyes, and even if there is the afterimage, it is not detected by the human eyes. Therefore, such an afterimage as having the moving speed that can easily be found by the human eyes, namely of such moving speed as moving from the right end to the left end of the video display during one second, has not been actually improved.

OBJECT AND SUMMARY OF THE INVENTION

An object of the present invention is to provide a noise reduction apparatus which is applicable to a luminance signal and a color difference signal of a video signal improves occurrence of an afterimage.

The noise reduction apparatus in accordance with the present invention comprises:

first delay means for delaying a first video input signal by a predetermined time length, first calculation means for outputting a finite difference signal between the first video input signal and the first video input signal delayed by the first delay means, transformation means comprising
  a transformation circuit for transforming the finite difference signal to a plurality of transformation components,
  a nonlinear operation circuit for applying nonlinear operation to the transformation components, and
  a inverse-transformation circuit for inverse-transforming the transformation components output from the nonlinear operation circuit, second calculation means for outputting another finite difference signal between the first video input signal and the output of the transformation means as a first video output signal, motion detection means for generating an output of a predetermined value in correspondence to a level of at least one transformation component output from the transformation means, second delay means for delaying a second video input signal by a predetermined time length, third calculation means for outputting still another finite difference signal between the second video input signal and the second video input signal delayed by the second delay means, nonlinear operation means for applying nonlinear operation to the finite difference signal output from the third calculation means on the basis of the output signal of the motion detection circuit, and fourth calculation means for outputting still another finite difference signal between the second video input signal and the output signal of the nonlinear operation means for a second video output signal.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 4 is a block diagram of a noise reduction apparatus of a second embodiment in accordance with the present invention;

DESCRIPTION OF THE PREFERRED EMBODIMENT

Figure 1:
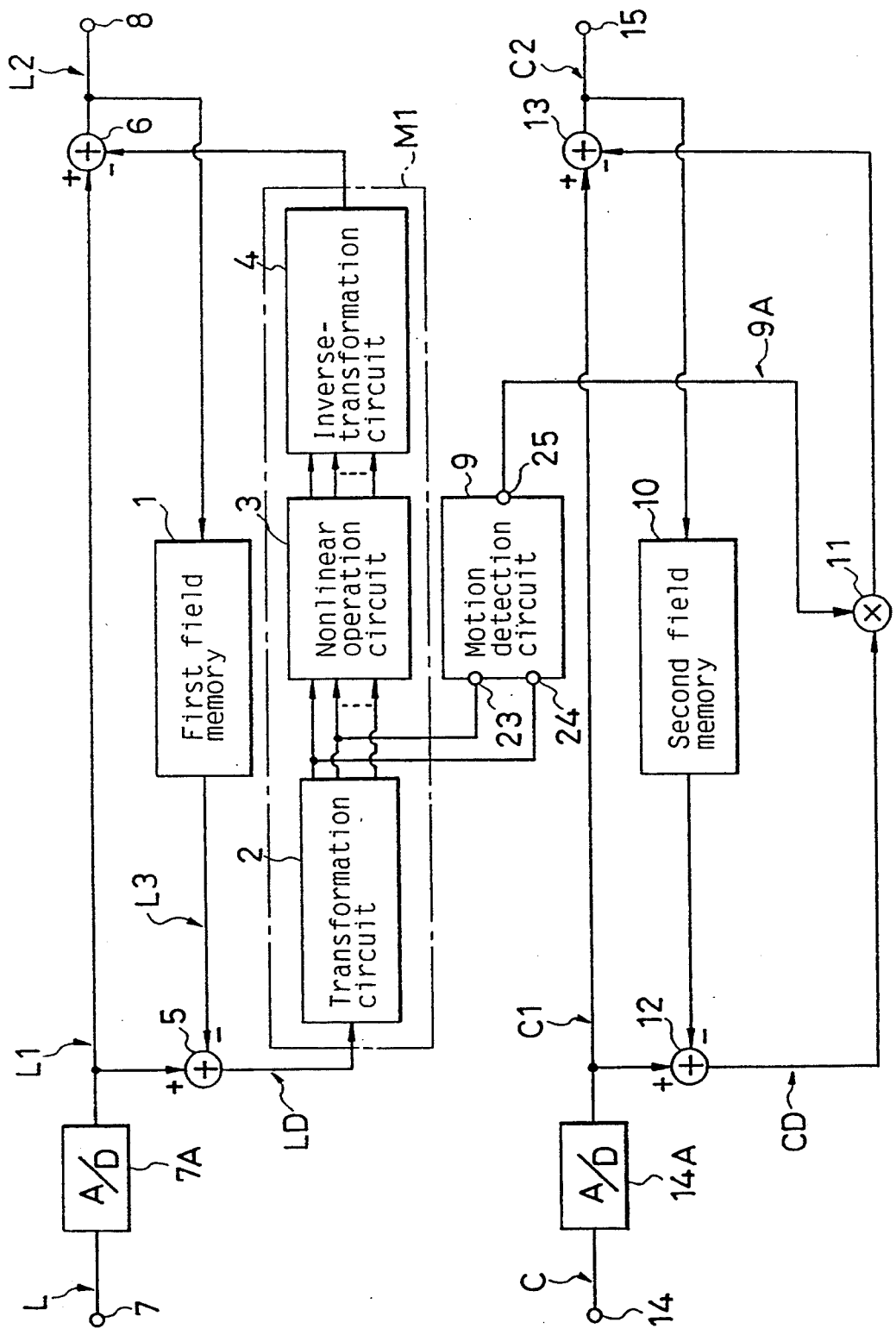
FIG. 1 is a block diagram of a noise reduction apparatus of a first embodiment in accordance with the present invention.

FIG. 1 is a block diagram of a noise reduction apparatus of a first embodiment in accordance with the present invention. Referring to FIG. 1, a luminance signal L of a television video signal is received at a terminal 7, and is converted into a digital signal by an A/D converter 7A with the sampling frequency of twice of the color subcarrier frequency. A digitized luminance signal L1 is applied to adders 5 and 6. In the adder 6, an output value of the Hadamard transformation operation circuit M1 which will be elucidated hereinafter is subtracted from the value of the luminance signal L1, and a luminance signal L2 is output at an output terminal 8. The luminance signal L2 is also inputted to a first field memory 1 and is stored therein.

The first field memory 1 stores data of one field of the luminance signal L2, and supplies a luminance signal L3 which has been delayed by one field to the adder 5. At this time, the luminance signal L1 of the subsequent field is also applied to the adder 5, and subtraction is carried out between both the luminance signals L1 and L3, and hence a finite difference signal of the luminance signals L1 and L3 is derived. The finite difference signal is called a field difference signal LD of the luminance signal L1, and represents a difference of the luminance signals between two neighboring fields.

The field difference signal LD is applied to Hadamard transformation operation circuit M1, the name of which is familiar to one skilled in the art. The Hadamard transformation operation circuit M1 comprises a transformation circuit 2 for receiving the field difference signal LD and performing the Hadamard transformation, a nonlinear operation circuit 3 for receiving the output of the transformation circuit 2 and outputting nonlinear-converted output thereof and an inverse-transformation circuit 4, for issuing the Hadamard inverse-transformation output.

Figure 8:
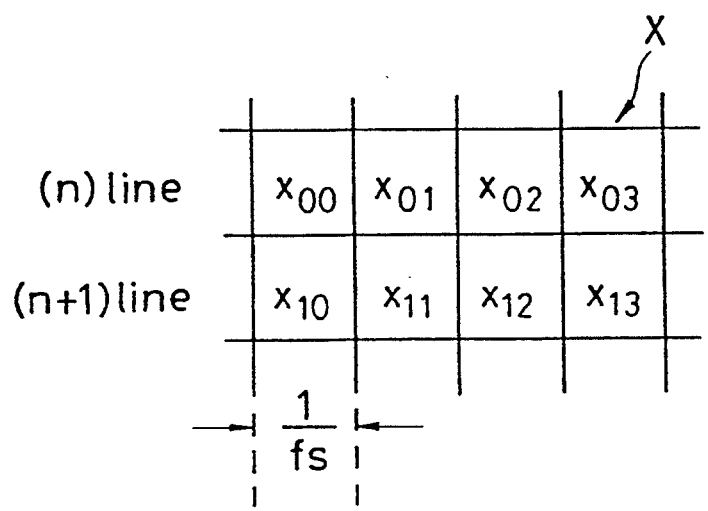
FIG. 8 is the diagram of the signal block representing the input signal of the Hadamard transformation in the prior art.
Figure 9:
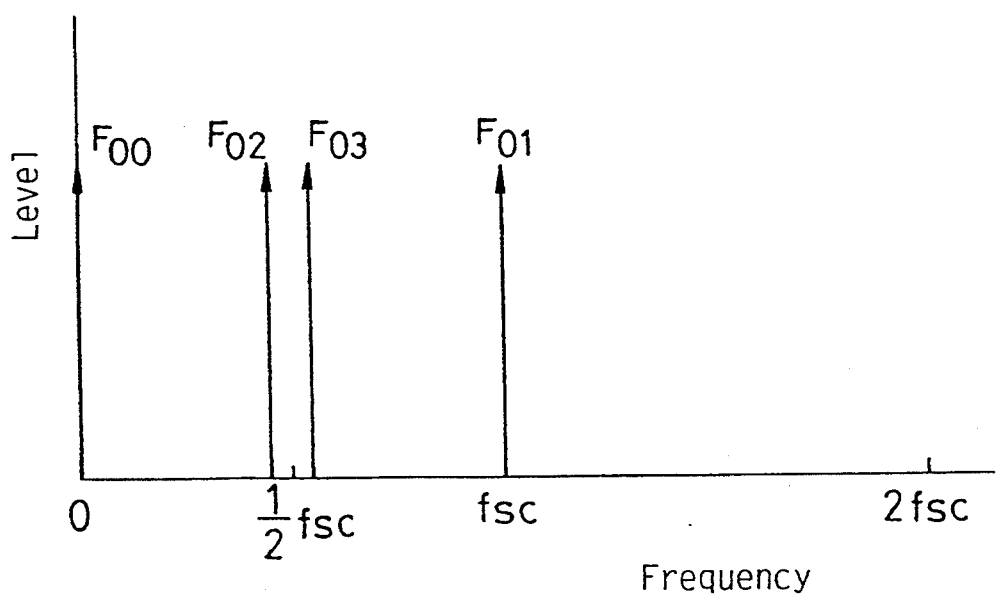
FIG. 9 is the spectrum distribution diagram of the Hadamard transformation components in the prior art.

An example of the Hadamard transformation operation which is used in the embodiment and is known per se is elucidated hereafter. FIG. 8 is a diagram of a signal block X. Referring to FIG. 8, two sets of four areas are defined on two neighboring scanning lines (n) and (n+1) of a video display, and thereby the signal block X is formed. Eight representations $x_{00}, x_{01}, x_{02}, x_{03}, x_{10}, x_{11}, x_{12}$ and $x_{13}$ in areas of the signal block X represent the respective field difference signals between neighboring two fields of the video signal. The Hadamard transformation of 2×4 dimension is applied to the signal block X.

The Hadamard transformation of 2×4 dimension is given by $$F = H_2 \cdot X \cdot H_4 \tag{1}$$

where,
F: Hadamard transformation component,
X: Signal block, and
$H_2$, $H_4$: Hadamard matrices of 2-dimension and 4-dimension, respectively.

The Hadamard transformation component F is given by $$F = \begin{vmatrix} F_{00} & F_{01} & F_{02} & F_{03} \\ F_{10} & F_{11} & F_{12} & F_{13} \end{vmatrix}. \tag{2}$$

The signal block X is given by $$X = \begin{vmatrix} X_{00} & X_{01} & X_{02} & X_{03} \\ X_{10} & X_{11} & X_{12} & X_{13} \end{vmatrix}. \tag{3}$$

The Hadamard matrixes $H_2$ and $H_4$ are give by $$H_2 = \begin{vmatrix} 1 & 1 \\ 1 & -1 \end{vmatrix}, \quad H_4 = \begin{vmatrix} H_2 & H_2 \\ H_2 & -H_2 \end{vmatrix}. \tag{4}$$

The Hadamard transformation components $F_{00}$, $F_{01}$, $F_{02}$, $F_{03}$, $F_{10}$, $F_{11}$, $F_{12}$ and $F_{13}$ shown in the equation (2) represent spatial frequency components included in the video signal as follows:

$F_{00}$: 2-dimensional low frequency component,
$F_{01}$, $F_{02}$, $F_{03}$: horizontal direction high frequency components,
$F_{10}$: vertical direction high frequency component, and
$F_{11}$, $F_{12}$, $F_{13}$: oblique direction high frequency components.

Figure 2:
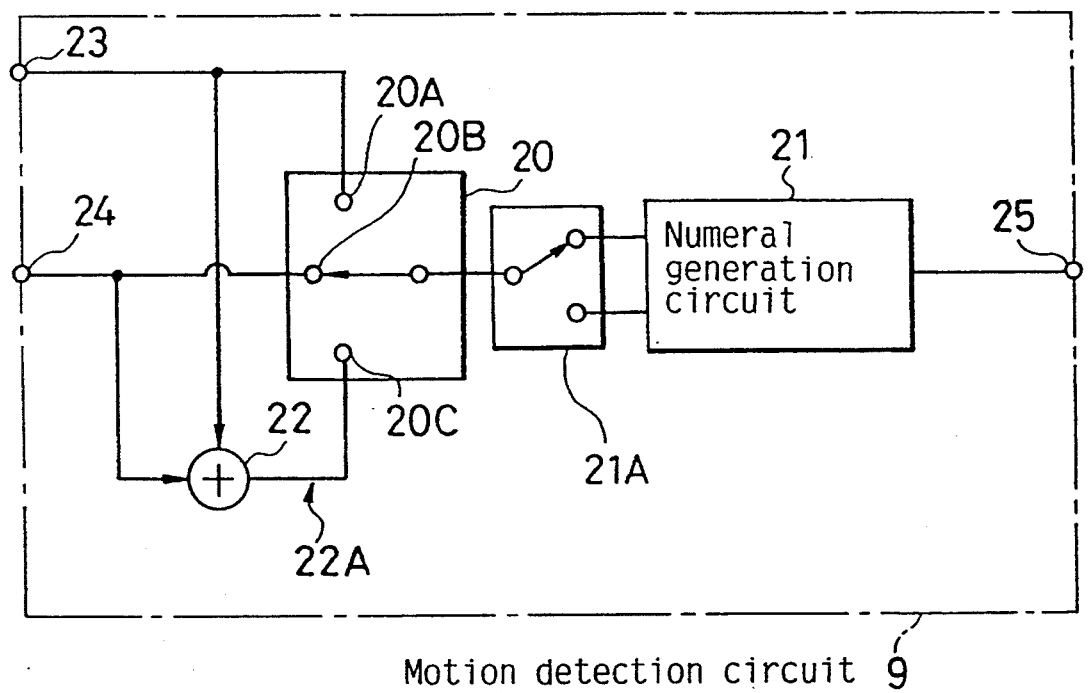
FIG. 2 is a block diagram of an example of a motion detection circuit.

At least one of the Hadamard transformation components output from the transformation circuit 2 is applied to a motion detection circuit 9, and thereby motion of the video image in the luminance signal is detected. Detailed configuration of the motion detection circuit 9 is shown in FIG. 2. Referring to FIG. 2, the low frequency component $F_{00}$ and horizontal direction high frequency component $F_{02}$ are received at input terminals 23 and 24, respectively. The reason why the low frequency component $F_{00}$ and the high frequency component $F_{02}$ are selected for the inputs of the motion detection circuit 9 is that the range of variation of these components $F_{00}$ and $F_{02}$ becomes a maximum when an edge of the video image moves in the horizontal direction on the video display. Therefore, the motion of the video image can be detected by detecting the value of the component $F_{00}$ or $F_{02}$ or the value of sum of both the components $F_{00}$ and $F_{02}$. The low frequency component $F_{00}$ and high frequency component $F_{02}$ are applied to contacts 20A and 20B of a selection circuit 20, respectively, and moreover are applied to an adder 22 and are added thereby. The resultant signal of the addition 22A is applied to a contact 20C of the selection circuit 20. In the selection circuit 20, one of three signals applied to the contacts 20A, 20B and 20C is selected and is applied through selector 21A to a numeral generation circuit 21 through a selector 21A. In actual use, the selection circuit 20 is constituted by an electronic switch and is operated by manual operation of an operator.

Figure 3A:
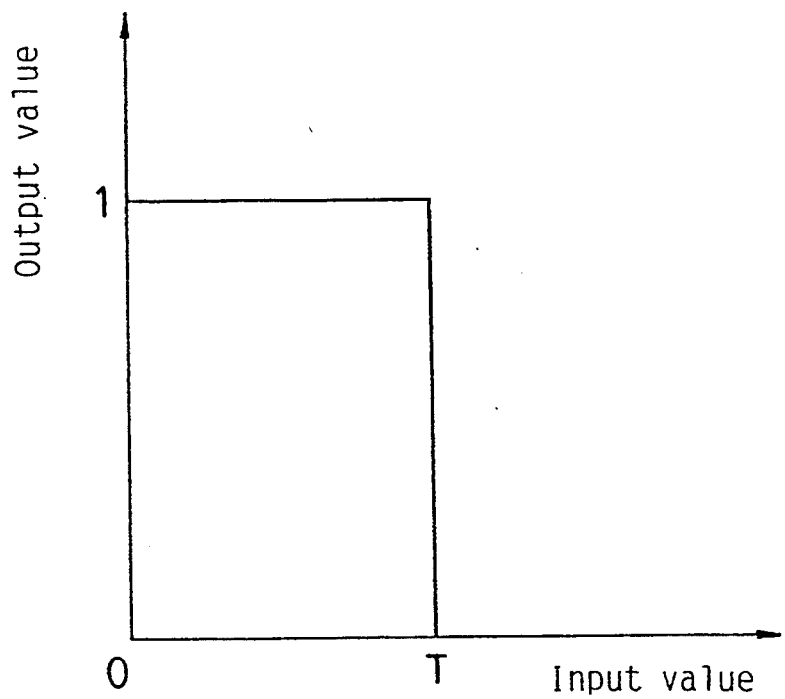
FIGS. 3(a), 3(b) are input-output characteristic diagrams of a nonlinear operation circuit in FIG. 1.
Figure 3B:
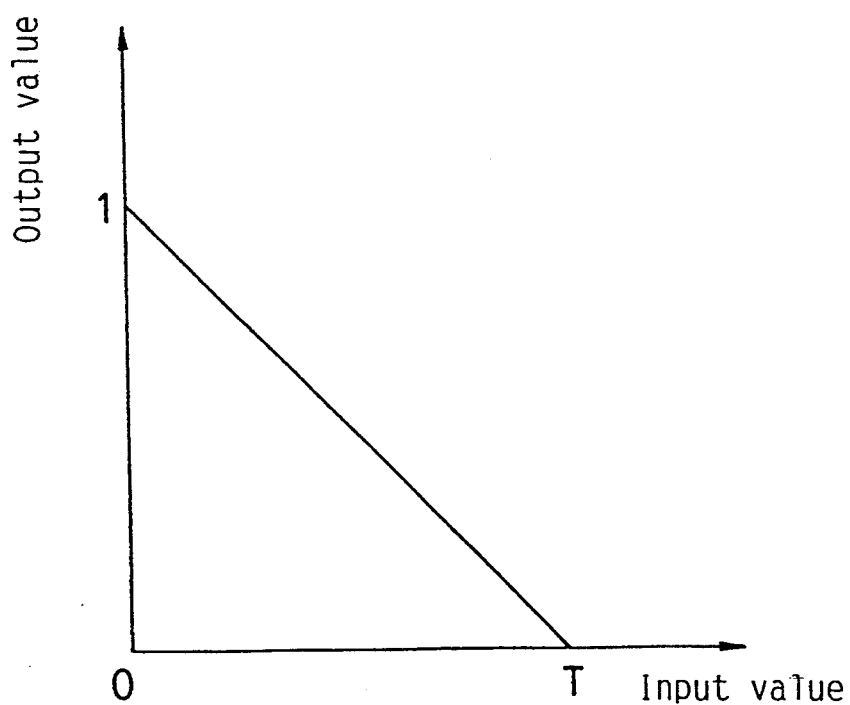

The numeral generation circuit 21 has an input-output characteristic as shown in FIG. 3(a) or FIG. 3(b), for example. According to the input-output characteristic shown in FIG. 3(a), when an input value corresponding to an amplitude of the Hadamard transformation component is a predetermined value T and below, the output value of the numeral generation circuit 21 becomes "1". And when the input value is larger than the predetermined value T, the output value becomes "0". On the other hand, according to the input-output characteristic shown in FIG. 3(b), when the input value is larger than the predetermined value T, the output value becomes "0"; and when the input value is the predetermined value T and below, the output value linearly corresponding to decrease of the input value; when the input value is "0", the output value becomes "1". The numeral generation circuit 21 is realizable by using a ROM, for example. One of the input-output characteristics in FIGS. 3(a) and 3(b) is selected with a selector 21A by an operator. The output 9A of the motion detection circuit 9 is applied to a multiplier 11.

Referring to FIG. 1, the Hadamard transformation components $F_{00}$–$F_{13}$ output from the transformation circuit 2 are applied to the nonlinear operation circuit 3. The nonlinear operation circuit 3 has the input-output characteristic which is familiar to one skilled in the art shown in FIG. 6(a). The output of nonlinear operation circuit 3 is applied to the inverse-transformation circuit 4, and the Hadamard inverse-transformation is performed. The output of the inverse-transformation circuit 4 is applied to a subtraction input terminal of the adder 6.

Figure 7:
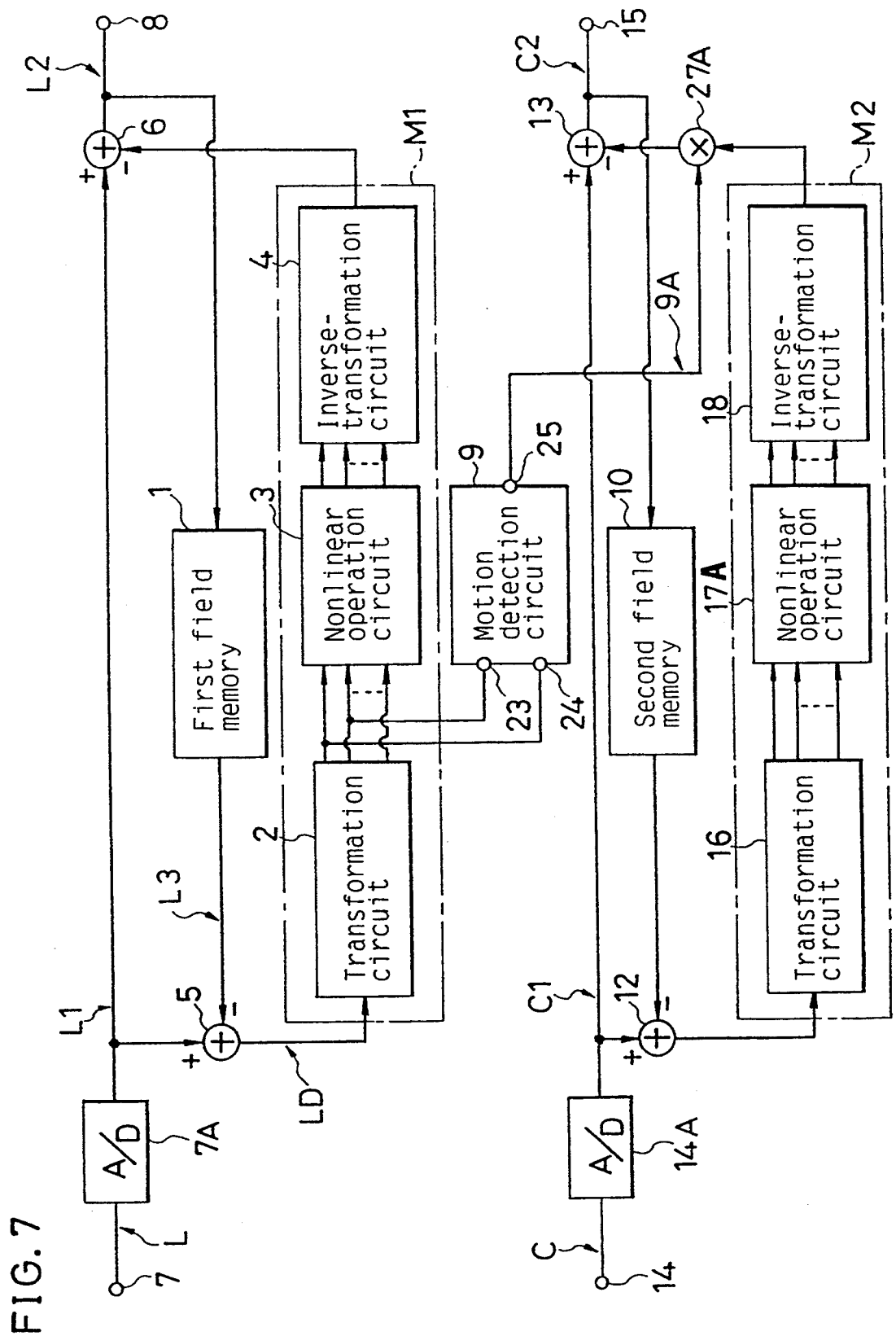
FIG. 7 is a block diagram of a noise reduction apparatus of a third embodiment in accordance with the present invention.

On the other hand, the color difference signal C received at a terminal 14 is applied to an A/D converter 14A and is converted to a digital signal. The color difference signal C1 of the digital signal is applied to adders 12 and 13. The output of the multiplier 11 is applied to a subtraction input terminal of the adder 13, and the output value of the multiplier 11 is subtracted from the value of the color difference signal C1. A color difference signal C2 output from the adder 13 is output at an output terminal 15 and is applied to a second field memory 10. Configuration and operation of the second field memory 10 is identical to those of the first field memory 1. The output of the second field memory 10 is applied to the adder 12, and a field difference signal CD of the color difference signal C1 is output and applied to the multiplier 11. In the embodiments of the present invention, one color difference signal is used for a color difference signal as shown in FIGS. 1, 4 and 7; but when the embodiments are applied to a video signal having two color difference signals, each of which is identical, two sets of the above-mentioned circuits are used.

Figure 10:
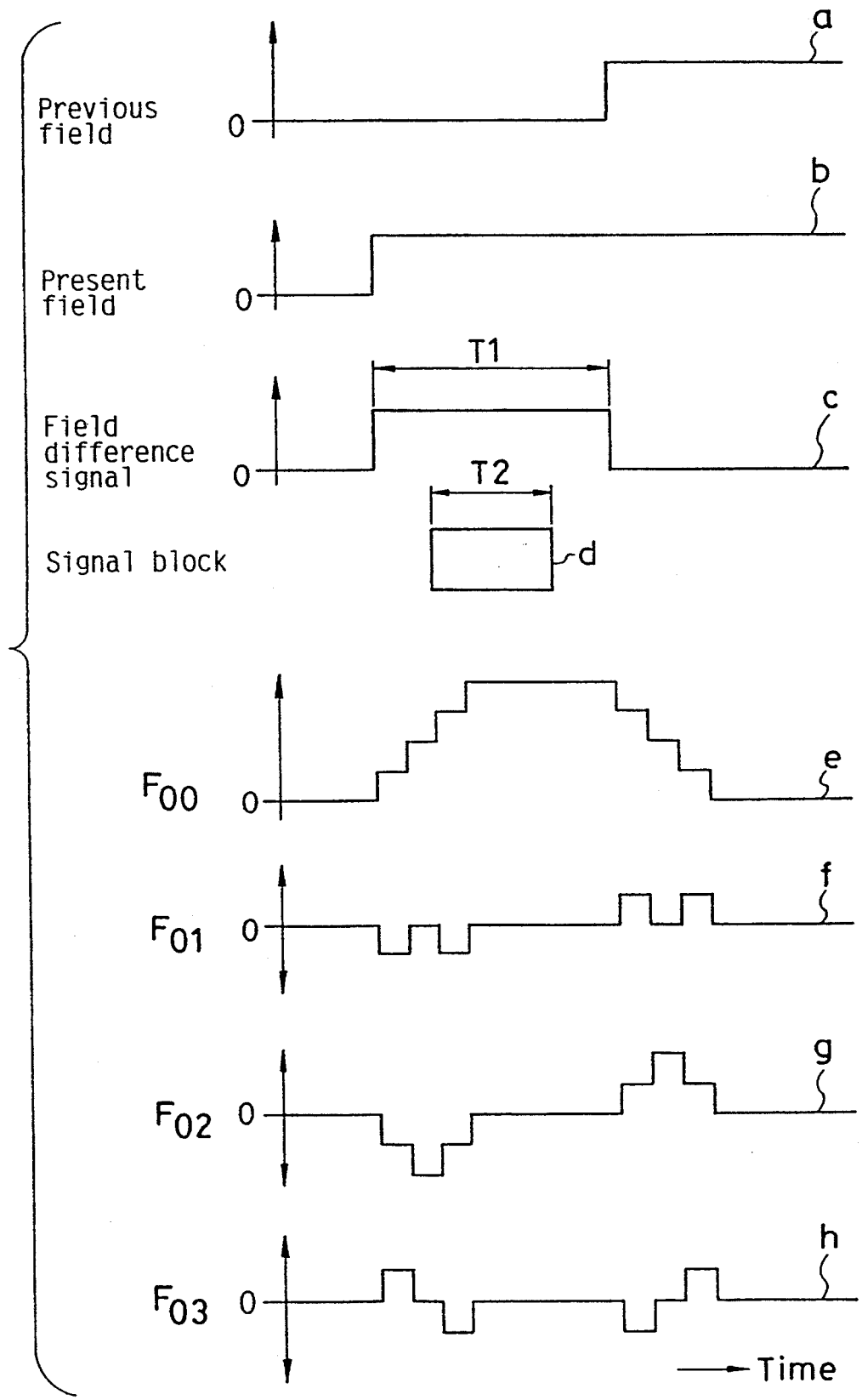
FIG. 10 is the waveforms of the Hadamard transformation components when the time length T1 of the field difference signal is larger than the time length T2 of the signal block.
Figure 11:
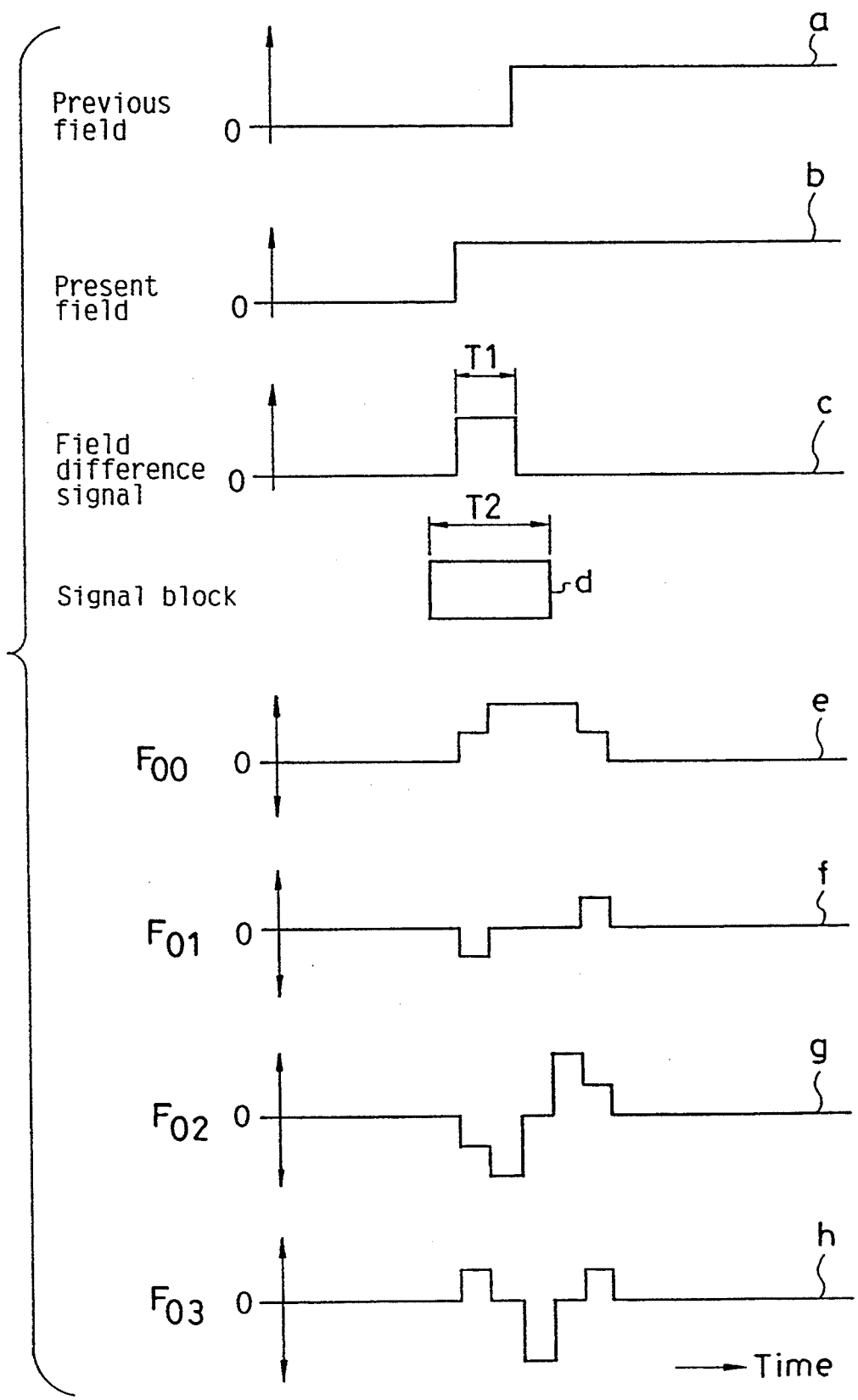
FIG. 11 is the waveforms of the Hadamard transformation components when the time length T1 of the field difference signal is smaller than the time length T2 of the signal block.

Hereafter, operation of the first embodiment is elucidated. In the adder 5, the value of the output signal of the first field memory 1 is subtracted from the value of the luminance signal L1, and the field difference signal LD is derived. The field difference signal LD is Hadamard-transformed by the transformation circuit 2 as shown by the equations (1), (2), (3) and (4), and the Hadamard transformation components $F_{00}$, $F_{01}$, $F_{02}$, $F_{03}$, $F_{10}$, $F_{11}$, $F_{12}$ and $F_{13}$ are output. In the nonlinear operation circuit 3, nonlinear operation is applied to the Hadamard transformation components $F_{00}$–$F_{13}$. Subsequently, the transformation components are inverse-transformed by the inverse-transformation circuit 4 and applied to the adder 6. In the adder 6, the output value of inverse-transformation circuit 4 is subtracted from the value of the luminance signal L1, and a luminance signal L2 is output at the output terminal 8. The noise reduction effect with respect to the luminance signal L1 is similar to the operation in the prior art shown in FIG. 10.

On the other hand, the value of the output signal of the second field memory 10 is subtracted from the value of the color difference signal C1 in the adder 12, and the field difference signal CD of the color difference signal is generated. Subsequently, the value of the field difference signal CD is multiplied by the value of the output 9A of the motion detection circuit 9 in the multiplier 11. The value of the output 9A is predetermined by the input-output characteristic as shown in FIG. 3(a) or FIG. 3(b), and one of them is selected by the selector 21A by an operator. Moreover, the Hadamard transformation component, which is applied to the numeral generation circuit 21, is selected with the selection circuit 20 by the operator. For example, in the case that the input-output characteristic shown in FIG. 3(a) is selected and the low frequency component $F_{00}$ is selected for the input transformation component, when the value of the amplitude of the low frequency component $F_{00}$ is larger than the predetermined value T, the value of the output 9A becomes "0", and the output value of the multiplier 11 becomes "0". Consequently, a subtraction input of the adder 13 becomes "0", and the color difference signal C2 becomes identical with the color difference signal C1. That is the color difference signal C1 is directly output at the terminal 15. When the value of the amplitude of the low frequency component $F_{00}$ is the predetermined value T or below, the value of the output signal of the multiplier 11 is the product made by multiplying the value of the field difference signal CD by "1". Then the field difference signal CD is output as it is. Consequently, the value of the field difference signal CD is subtracted from the value of the color difference signal C1 in the adder 13 and a resultant color difference signal C2 is output therefrom.

According to the first embodiment, when the variation of the luminance signals between two neighboring fields is sufficiently small (motion of the video image is sufficiently small), the output level of the low frequency component $F_{00}$ is relatively low, and the value of the output 9A of the motion detection circuit 9 is nearly equal to "1". Therefore, the field difference signal CD of the color difference signal is applied to the adder 13, and is subtracted from the color difference signal C1. Consequently, noise in the color difference signal C1 is reduced, but the afterimage appears. On the contrary, when the variation of the luminance signals between the neighboring two fields is larger than the predetermined value T, the value of the output 9A of the motion detection circuit 9 becomes "0", and the field difference signal CD of the color difference signal C1 is not output from the multiplier 11. Consequently, the field difference signal CD is not subtracted from the color difference signal C1 in the adder 13. And thus the noise in the color difference signal C1 is not reduced and the afterimage is not generated either.

In the noise reduction apparatus in accordance with the first embodiment, the field difference signal of the color difference signal is varied at the same ratio throughout the entire frequency band width. Therefore in this case, the noise reduction effect becomes maximum on a still image, and generation of the afterimage becomes maximum, too. In the actual video image, defocus is generated at the edge of a vertical line.

In order to resolve the difficulty, a Hadamard transformation operation circuit is installed in the noise reduction circuit of the color difference signal as shown in a second embodiment of the present invention.

FIG. 4 is a block diagram of the second embodiment of the noise reduction apparatus. Referring to FIG. 4, configurations and operations of the A/D converter 7A, the first field memory 1, the Hadamard transformation operation circuit M1, the adders 5 and 6 and the motion detection circuit 9 are identical with those of the first embodiment, and the duplicated explanation is omitted.

In the second embodiment, a Hadamard transformation operation circuit M2 is added to the circuit of the previous embodiment to reduce the noise in the color difference signal C. The A/D converter 14A, the second field memory 10 and the adders 12 and 13 In the circuit are identical with those of the first embodiment. A transformation circuit 16 and an inverse-transformation circuit 18 in the Hadamard transformation operation circuit M2 are identical with the transformation circuit 2 and inverse-transformation circuit 4, respectively; but a nonlinear operation circuit 17 is different from the nonlinear operation circuit 3.

Figure 5:
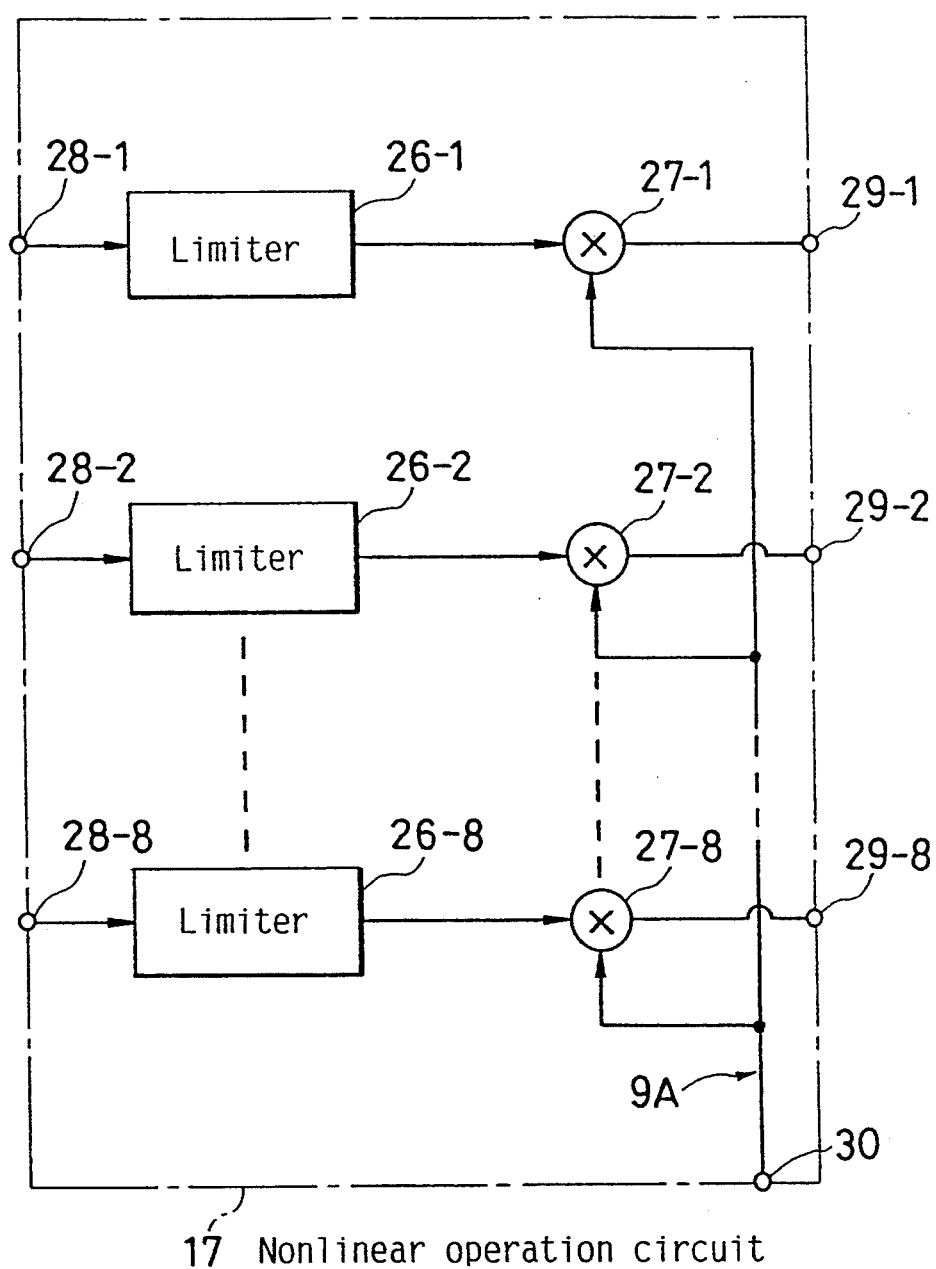
FIG. 5 is a block diagram of an example of a nonlinear operation circuit in FIG. 4.

Detailed configuration of the nonlinear operation circuit 17 is shown in FIG. 5. Referring to FIG. 5, eight limiters 26-1, 26-2, - - - , 26-8 are provided in correspondence with eight Hadamard transformation components $F_{00}$, $F_{01}$, - - - , $F_{13}$, which are output from the transformation circuit 16 (in the Hadamard transformation of 2×4). The Hadamard transformation components $F_{00}$, $F_{01}$, - - - , $F_{13}$ are received at the respective input terminals 28-1, 28-2, - - - , 28-8. The outputs of the limiters 26-1, 26-2, - - - , 26-8 are applied to the respective multipliers 27-1, 27-2, - - -, 27-8. The output 9A of the motion detection circuit 9 is applied to every multipliers 27-1, 27-2, - - - , 27-8.

Figure 6A:
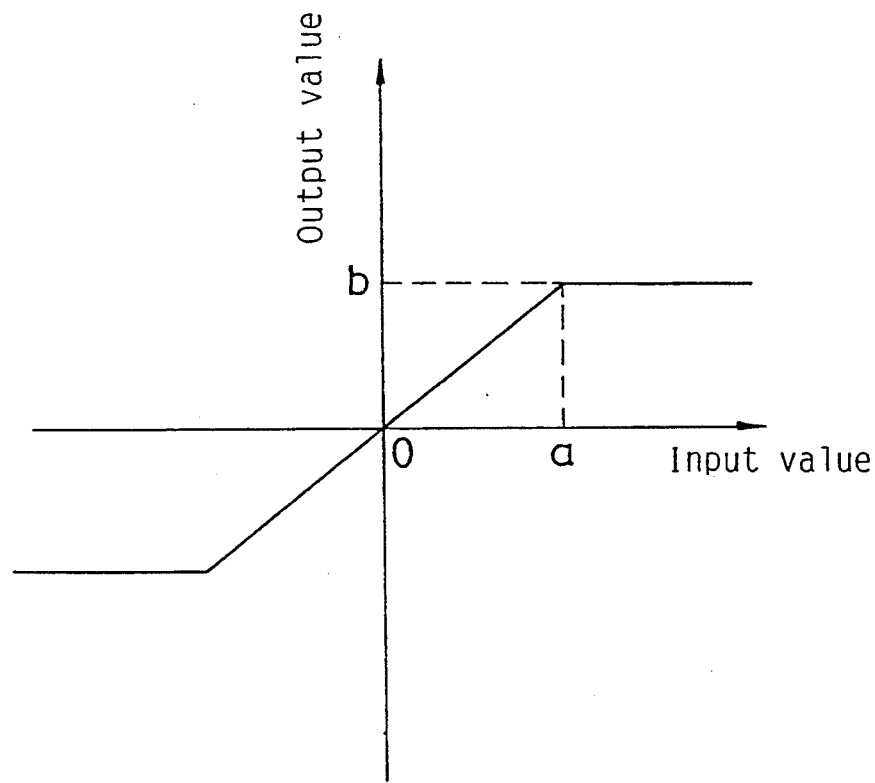
FIG. 6(a), 6(b) are the input-output characteristic diagram of the nonlinear operation circuit in FIG. 4.
Figure 6B:
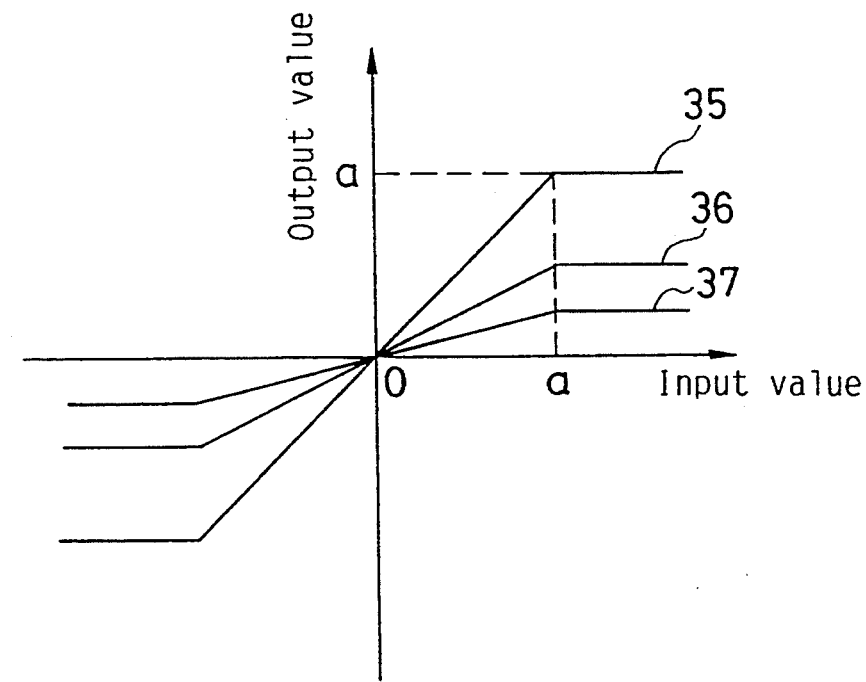

Input-output characteristic of the limiters 26-1 26-2, - - - , 26-8 is shown in FIG. 6(a). Referring to FIG. 6(a), when an input value is a predetermined value "a" or below, an output value is in proportion to the input signal level. When the input value is higher than the predetermined value "a", the output value becomes a constant value "a". The outputs of the limiters 26-1, 26-2, - - - , 26-8 are multiplied by the value of the output 9A in the respective multipliers 27-1, 27-2, - - - , 27-8. The output values of the multipliers 27-1, 27-2, - - - , 27-8 are varied by the value of the output 9A, and thereby the input-output characteristics of the limiters 26-1, 26-2, - - - , 26-8 are substantially changed. The input-output characteristics of a limiter in the cases of "1", "0.5" and "0.25" of the value of the output 9A are illustrated by curves 35, 36 or 37 in FIG. 6(b), respectively.

In the second embodiment, for example, in case a where the output 9A of the motion detection circuit 9 having the input-output characteristic shown in FIG. 3(b) is applied to the nonlinear operation circuit 17, when the variation of a video image in the luminance signal between two neighboring fields is small (when the motion of the video image is small), the value of the output 9A is nearly equal to "1". Therefore the output levels at the output terminals 29-1, 29-2, - - - , 29-8 of the nonlinear circuit 17 become nearly equal to the output level of the limiters 26-1, 26-2, - - -, 26-8, respectively (curve 35 in FIG. 6(b)). Consequently, the output level of the Hadamard transformation operation circuit M2 becomes the maximum value, and the noise reduction effect is increased. In this case, occurrence of the afterimage is also increased. However, since the motion of the video image is small, the afterimage is not so conspicuous.

On the contrary, in a case where there is a large motion in the video image, the value of the output 9A is smaller than "1", for example, 0.5 or 0.25, etc. Consequently, the output level of the nonlinear operation circuit 17 is lowered, and hence the noise reduction effect is decreased. Generally, the afterimage is conspicuous in the large motion of the video Image. In this case, however, the afterimage is hardly conspicuous, since the occurrence of the afterimage is decreased in correspondence to the decrease of the noise reduction effect.

FIG. 7 is a block diagram of a third embodiment of the noise reduction apparatus in accordance with the present invention. Referring to FIG. 7, the block diagram of the third embodiment is different from the block diagram of the second embodiment shown in FIG. 4 in respect of a nonlinear operation circuit 17A and a multiplier 27A. In the nonlinear circuit 17 of the second embodiment, the multipliers 27-1, 27-2, - - -, 27-8 of the same number (8) as that of the eight transformation components $F_{00}$–$F_{13}$ are provided. On the other hand, in the nonlinear operation circuit 17A of the third embodiment the multipliers 27-1, 27-2, - - -, 27-8 (shown in FIG. 5) are not provided, but only the limiters 26-1, 26-2, - - -, 26-8 are provided therein. A multiplier 27A is placed between the inverse-transformation circuit 18 and the adder 13. The input-output characteristic of the limiters 26-1, 26-2, -- -, 26-8 in the nonlinear circuit 17A is set to the characteristic shown by the curve (35) of FIG. 6(b). In this third embodiment, the output of the multiplier 27A is substantially changed as shown by the curves 36 or 37 of FIG. 6(b) by the output value of the output 9A of the motion detection circuit 9 which is applied to the multiplier 27A. The noise reduction effect and the afterimage suppression effect in the third embodiment are equal to those of the second embodiment.

In these first, second and third embodiments, the Hadamard transformation of 2×4 dimension is applied, but the dimension of the Hadamard transformation is not limited to the 2×4 dimension. Moreover, it is not necessary to form the signal block by the data of consecutive areas, but the signal block can be formed by the data of areas which are apart from each other on the video display.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A noise reduction apparatus comprising:
   first delay means for delaying a first video input signal by a predetermined time length,
   first calculation means for outputting a finite difference signal between said first video input signal and the first video input signal delayed by said first delay means,
   transformation means comprising:
     a transformation circuit for applying nonlinear operation to said transformation components, and
     an inverse-transformation circuit for inverse-transforming said transformation components output from said nonlinear operation circuit,
   second calculation means for outputting another finite difference signal between said first video input signal and an output of the inverse-transformation circuit of said transformation means as a first video output signal,
   motion detection means for generating an output of a predetermined value in correspondence to a level of at least one transformation component output from said transformation means,
   second delay means for delaying a second video input signal by a predetermined time length,
   third calculation means for outputting still another finite difference signal between said second video input signal and the second video input signal delayed by said second delay means,
   multiplier for multiplying the finite difference signal output from said third calculation means by the output signal of said motion detection means in order to give nonlinear operation to said finite difference signal, and
   fourth calculation means for outputting still another finite difference signal between said second video input signal and the output signal of said nonlinear operation means for a second video output signal.

2. A noise reduction apparatus comprising:
   first delay means for delaying a first video input signal by a predetermined time length,
   first calculation means for outputting a finite difference signal between said first video input signal and the first video input signal delayed by said first delay means,
   transformation means comprising
     a transformation circuit for transforming said finite difference signal to a plurality of transformation components,
     a nonlinear operation circuit for applying nonlinear operation to said transformation components, and
     an inverse-transformation circuit for inverse-transforming said transformation components output from said nonlinear operation circuit,
   second calculation means for outputting another finite difference signal between said first video input signal and an output signal of the inverse-transformation circuit of said transformation means for a first video output signal,
   motion detection means for generating an output signal of a predetermined value in correspondence to a level of at least one of said transformation components,
   second delay means for delaying a second video input signal by a predetermined time length,
   third calculation means for outputting still another finite difference signal between said second video input signal and the second video input signal delayed by said second delay means, a multiplier for multiplying the value of said finite difference signal output from said third calculation means by the value of the output of said motion detection means, and fourth calculation means for outputting still another finite difference signal between said second video input signal and said output signal of said multiplier for a second video output signal.

3. A noise reduction apparatus comprising:

first delay means for delaying a first video input signal by a predetermined time length, first calculation means for outputting a finite difference signal between said first video input signal and the first video input signal delayed by said first delay means, first transformation means comprising
- a transformation circuit for transforming said finite difference signal into a plurality of first transformation components,
- a nonlinear operation circuit for applying nonlinear operation to said first transformation components and
- an inverse-transformation circuit for inverse-transforming said first transformation components output from said nonlinear operation circuit, second calculation means for outputting another finite difference signal between said first video input signal and an output signal of the inverse-transformation circuit of said transformation means for a first video output signal, motion detection means for generating the output of a predetermined value in correspondence to the level of at least one of said transformation components, second delay means for delaying a second video input signal by a predetermined time length, third calculation means for outputting still another finite difference signal between said second video input signal and the second video input signal delayed by said second delay means, second transformation means comprising
- a transformation circuit for transforming said finite difference signal output from said third calculation means into a plurality of second transformation components,
- nonlinear operation circuit for applying nonlinear operation to said second transformation components on the basis of the output signal of said motion detection means, and
- an inverse-transformation circuit for inverse-transforming said second transformation components output from said nonlinear operation circuit, and fourth calculation means for outputting still another finite difference signal between said second video input signal and an output signal of the inverse-transformation circuit of said transformation means for a second video output signal.

4. A noise reduction apparatus comprising:

first delay means for delaying a first video input signal by a predetermined time length, first calculation means for outputting a finite difference signal between said first video input signal and the first video input signal delayed by said first delay means, first transformation means comprising
- a transformation circuit for transforming said finite difference signal into a plurality of first transformation components,
- a nonlinear operation circuit for applying nonlinear calculation to said first transformation components and
- an inverse-transformation circuit for inverse-transforming said first transformation components output from said none linear calculation circuit, second calculation means for outputting another finite difference signal between said first video input signal and an output signal of the inverse-transformation circuit said transformation means for a first video output signal, motion detection means for generating an output signal of a predetermined value in correspondence to the level of at least one of said transformation components, second delay means for delaying a second video input signal by a predetermined time length, third calculation means for outputting still another finite difference signal between said second input signal and the second video input signal delayed by said second delay means, second transformation means comprising
- a transformation circuit for transforming said finite difference signal output from said third calculation means into a plurality of second transformation components,
- a nonlinear operation circuit for applying nonlinear operation to said second transformation components and
- an inverse-transformation circuit for inverse-transforming said second transformation components output from nonlinear operation circuit, multiplier for multiplying an output signal of the inverse-transformation circuit of said second transformation means by the output signal of said motion detection means, and fourth calculation means for outputting still another finite difference signal between said second video input signal and an output signal of the inverse-transformation circuit of said second transformation means for a second video output signal.

5. A noise reduction apparatus in accordance with claim 1, 2, 3 or 4, wherein
said first video input signal is a luminance signal and said second video input signal is a color difference signal.

6. A noise reduction apparatus in accordance with claim 1, 2, 3 or 4, wherein
said predetermined time length of said first delay means and said second delay means are equal to the time length of at least one field of a video signal.

7. A noise reduction apparatus in accordance with claim 1, 2, 3 or 4, wherein
said predetermined time length of said first delay means and said second delay means are equal to the time length of at least one frame of a video signal.

8. A noise reduction apparatus in accordance with claim 1, 2, 3 or 4, wherein
said predetermined time length of said first delay means and said second delay means are equal to a scanning time of a predetermined number of scanning line of a video signal.

* * * * *

UNITED STATES PATENT AND TRADEMARK OFFICE
CERTIFICATE OF CORRECTION

PATENT NO. : 5,404,179
DATED : April 4, 1995
INVENTOR(S) : HAMASAKI, T.

It is certified that error appears in the above-indentified patent and that said Letters Patent is hereby corrected as shown below:

Column 12, lines 6 and 7, delete "applying nonlinear operation to said transformation components," insert
   --a transformation circuit for transforming said finite difference signal to a plurality of transformation components,
     a nonlinear operation circuit for applying nonlinear operation to said transformation components,--.

Signed and Sealed this

Nineteenth Day of December, 1995

Attest:

BRUCE LEHMAN

Attesting Officer    Commissioner of Patents and Trademarks